UNITED STATES PATENT OFFICE.

CARL T. FULLER, OF EAST ORANGE, NEW JERSEY, ASSIGNOR TO GENERAL ELECTRIC COMPANY, A CORPORATION OF NEW YORK.

PROCESS OF TREATING TUNGSTEN.

1,077,827.

No Drawing.

Specification of Letters Patent. Patented Nov. 4, 1913.

Application filed May 6, 1911. Serial No. 625,617.

*To all whom it may concern:*

Be it known that I, CARL T. FULLER, a citizen of the United States, residing at East Orange, in the county of Essex, State of New Jersey, have invented certain new and useful Improvements in Processes of Treating Tungsten, of which the following is a specification.

My invention relates to the manufacture of articles of tungsten or other metal of the chromium group of the periodic system, and comprises a process whereby the mechanical strength and the softness of such bodies may be enhanced.

I will describe the process both as applied to already shaped tungsten bodies and as applied in connection with the manufacture of such bodies.

Tungsten filaments or other coherent bodies of tungsten may be produced by a number of well known methods. For example, finely powdered oxid of tungsten is mixed with a carbonizable binder, the filament or other body is formed by squirting or molding this mixture, and after carbonization the carbon residue from the binder is removed by interaction at high temperature with the oxygen of the oxid, leaving a coherent body of tungsten. By another process the finely powdered metal is shaped with a carbonizable binder and upon carbonization the carbon residue is removed by firing the tungsten body in hydrogen, or other reducing gas, in the presence of a small amount of water vapor. The above are examples of the so-called paste process. The coherent bodies of tungsten can also be produced by incorporating or alloying tungsten with a ductile metal, shaping the desired tungsten body, and finally by appropriate heat treatment removing the ductile metal and sintering the tungsten into a coherent mass.

While tungsten bodies produced by any of the above and other well known methods are coherent enough to be handled and possess a certain amount of elasticity, they are still quite weak mechanically, and the metal is hard and brittle. In accordance with one method of carrying out my invention, the material is subjected to the influence of a carbid at a high temperature. This may be done either before or after shaping into filamentary or other bodies, or even while the material is still in the form of a compound such as oxid. When shaped bodies of tungsten or other similar metals are to be treated, they are packed in finely-powdered carbid,—such as an alkaline-earth carbid, as calcium carbid,—and are then given a heat treatment the highest temperature of which is just below the softening temperature of the carbid packing. This limiting temperature should not be exceeded in order to avoid a sintering and consolidation of the packing, thereby making difficult or impossible the removal of the filaments or bodies from the packing.

The process is carried out by loosely packing filaments, rods, or other bodies to be treated in the powdered carbid in a suitable container, as an iron tube. When thus packed, the iron tube is preferably closed so as to avoid access of air and the tube is then heated, as by means of a gas flame, to a temperature of from 850° to 1000° C. Preferably this temperature should be gradually approached during a period of from 4 to 5 hours and should be maintained for a period of 10 to 15 hours, and the tube with its contents should then be allowed to cool slowly, say for a period of 4 to 5 hours. Upon removal from the carbid packing the metal will be found to have been materially improved in strength and increased in softness.

The beneficial effect of the heat treatment in the carbid packing is apparently due to the removal of impurities from the metallic tungsten or other similar metals, as the case may be, under such conditions as will prevent the deterioration of the metal by external agencies or by crystallization. It is my opinion that at the firing temperature minute amounts of the carbid are decomposed,—as, for example, by reacting with small amounts of water vapor oxygen, or even the metal to be treated, itself,—thereby yielding decomposition products which exert a beneficial effect. If this view is correct, the effect may be complete at this stage or may be due to the subsequent presence of the reaction product in the body. However it is produced, the beneficial effect of the carbid treatment may also be obtained during the manufacture of the filaments. The carbid of calcium can be incorporated with tungsten powder or other similar metal powder into a squirting or molding mixture. For example, finely divided tungsten or other similar metal containing 5% of finely powdered calcium carbid is incorporated into a solution of nitrocellulose in amyl acetate in proper proportions to make a plastic mass. This mass is squirted in the usual way into filament form. The filaments are dried, carbonized, and treated by incandescing in a mixture of 70% nitrogen and 30% hydrogen in the usual way. The treating step not only removes the carbon, as is usual, but also causes the calcium carbid to produce its beneficial effect.

According to another mode of employing my invention, calcium carbid in amounts of one to two per cent. may to advantage be added to dry powder of tungsten or other similar metals. The mixture is subjected to pressure in a steel or other suitable mold to form small billets or sticks. As the sticks come from the press, they are placed in a gas heated iron tube furnace through which hydrogen is passed. The sticks may to advantage be placed in an iron boat and packed about with powdered carbid. This heat treatment should be at a temperature of 1100 to 1300° C., and should be continued for about two hours. During the treatment the rods shrink and become stronger. They are finally mounted in a large treating apparatus filled with hydrogen and there subjected to the passage of current, the temperature being raised to approach near the melting point. This treatment should be continued for about 10 minutes, and results in a dense hard stick or rod of metal. The rod thus obtained is then swaged in a machine of the general type set forth, for example, in U. S. patent to Dayton, No. 515,576, Feb. 27, 1904. The rod is heated to a temperature of about 1300° at the beginning of the swaging treatment. This heating can be conveniently carried out by placing the rod in a porcelain tube furnace kept hot electrically. A stream of hydrogen passing through the furnace keeps the metal from oxidation. When the rod has attained the above temperature, it is quickly passed still hot into the swaging machine. The above operation is repeated until the required reduction and diameter has been obtained to enable the wire to be further reduced by drawing the same. The beneficial effect of the carbid may also be obtained by heating the oxid of tungsten or other similar metals to a high temperature (say 1200° to 1500° C.) in the presence of calcium carbid in amounts ranging from 0.1 to 5%.

It will be understood that my process in its various modifications may be applied to other metals of the chromium group of the periodic system with beneficial effect, and that carbids of other metals can be used in place of the calcium carbid.

It is to be understood that I am not limited to any particular theory as to the cause of the beneficial effects of the carbid, but I have given such description of the method of treating the metal as to enable those skilled in the art to use the same regardless of any theory.

What I claim as new, and desire to secure by Letters Patent of the United States, is:—

1. The process of treating tungsten bodies which consists in gradually heating said bodies in a packing of calcium carbid to a temperature just below the softening point of the carbid.

2. The process which consists in firing tungsten bodies in a packing consisting of water reacting metallic carbid to a temperature just below the softening point of the carbid and then slowly reducing the temperature.

3. The process which consists in firing tungsten bodies in a packing consisting of metallic carbid.

4. The process which consists in firing articles of tungsten in a packing consisting of water-reacting carbid.

5. The process which consists in firing tungsten articles in a packing of calcium carbid.

6. The method of securing superior strength and mechanical properties in filaments and other bodies of tungsten which consists in subjecting the filament material to a high temperature in the presence of metallic carbid.

7. The process which consists in heating tungsten filament material at a high temperature in the presence of calcium carbid.

8. The process which consists in heating tungsten or its compounds at a high temperature in the presence of a water reacting carbid.

In witness whereof, I have hereunto set my hand this 4th day of May, 1911.

CARL T. FULLER.

Witnesses:
J. H. ELKINS,
G. F. LYNCH.